US012655059B2

(12) United States Patent
Bhattacharyya et al.

(10) Patent No.: US 12,655,059 B2
(45) Date of Patent: Jun. 16, 2026

(54) GLASS ARTICLE COMPRISING N-DOPED GRAPHENE

(71) Applicants:CORNING INCORPORATED, Corning, NY (US); Fundació Institut de Ciències Fotòniques (ICFO), Castelldefelts (ES); Institució Catalana de Recerca i Estudis Avançats (ICREA), Barcelona (ES)

(72) Inventors: Indrani Bhattacharyya, Hayward, CA (US); Miriam Marchena Martin-Francés, Barcelona (ES); Prantik Mazumder, Ithaca, NY (US); Valerio Pruneri, Castelldefels (ES)

(73) Assignees: CORNING INCORPORATED, Corning, NY (US); Institute of Photonic Science, Castelldefelts (ES); INSTITUCIÓ CATALANA DE RECERCA I ESTUD, Barcelona (ES)

( * ) Notice: Subject to any disclaimer, the term of this patent is extended or adjusted under 35 U.S.C. 154(b) by 219 days.

(21) Appl. No.: 18/293,463

(22) PCT Filed: Jul. 29, 2022

(86) PCT No.: PCT/US2022/038753
§ 371 (c)(1),
(2) Date: Jan. 30, 2024

(87) PCT Pub. No.: WO2023/014579
PCT Pub. Date: Feb. 9, 2023

(65) Prior Publication Data
US 2024/0327275 A1    Oct. 3, 2024

Related U.S. Application Data

(60) Provisional application No. 63/228,825, filed on Aug. 3, 2021.

(51) Int. Cl.
*C03C 17/34* (2006.01)
*C03C 21/00* (2006.01)

(52) U.S. Cl.
CPC ........ *C03C 17/3441* (2013.01); *C03C 21/002* (2013.01); *C03C 2217/28* (2013.01)

(58) Field of Classification Search
None
See application file for complete search history.

(56) References Cited

U.S. PATENT DOCUMENTS 8,722,442 B2    5/2014    Kim et al.
8,853,034 B2    10/2014    Afzali-Ardakani et al.
(Continued)

FOREIGN PATENT DOCUMENTS

CN    102656702 A    9/2012
CN    103241730 A    8/2013
(Continued)

OTHER PUBLICATIONS

Dissanayake et al., "Spontaneous and strong multilayer graphene n-doping on soda-lime glass and its application in graphene-semiconductor junctions" Scientific Reports, vol. 6 No. 21070, 2016, pp. 1-7.
(Continued)

*Primary Examiner* — David Sample
(74) *Attorney, Agent, or Firm* — Russell S. Magaziner

(57) ABSTRACT

Provided herein is a glass article comprising: an ion-exchanged glass layer comprising a first major surface and a second major surface; and at least one negatively doped graphene layer having a first major surface and a second major surface; the negatively doped graphene layer first major surface located opposite at least a portion of at least one of the first major surface and the second major surface of the ion-exchanged glass layer, the negatively doped
(Continued)

graphene layer having a carrier density of at least about $10^{13}$ $cm^{-2}$. Also provided herein are devices comprising the glass article and methods of making the glass article.

20 Claims, 4 Drawing Sheets

(56) References Cited

U.S. PATENT DOCUMENTS

| | | | |
|---|---|---|---|
| 9,387,651 | B2 | 7/2016 | Cleary et al. |
| 11,214,491 | B2 | 1/2022 | Arliguie et al. |
| 2011/0030772 | A1 | 2/2011 | Veerasamy |
| 2011/0127638 | A1 | 6/2011 | Brenner et al. |
| 2014/0054550 | A1 | 2/2014 | Hong et al. |
| 2014/0087193 | A1 | 3/2014 | Cites et al. |
| 2015/0168747 | A1* | 6/2015 | Kadono .................. G02F 1/015 349/139 |
| 2016/0176755 | A1* | 6/2016 | Johnson .................. C03C 15/00 216/67 |
| 2016/0227639 | A1* | 8/2016 | Kaminer .................. H05H 3/00 |
| 2017/0113963 | A1 | 4/2017 | Kim et al. |
| 2025/0296878 | A1 | 9/2025 | Marchena et al. |

FOREIGN PATENT DOCUMENTS

| | | |
|---|---|---|
| CN | 107298533 A | 10/2017 |
| CN | 108137384 A | 6/2018 |
| CN | 110550869 A | 12/2019 |
| CN | 113165881 A | 7/2021 |
| JP | 2018-002552 A | 1/2018 |
| WO | 2019/023170 A1 | 1/2019 |
| WO | 2020/081306 A1 | 4/2020 |

OTHER PUBLICATIONS

Goniszewski et al; "Correlation of p-doping in CVD graphene with substrate surface charges"; Scientific Reports 2016, 6, 22858.

International Search Report and Written Opinion of the International Searching Authority; PCT/US2022/038753; dated Oct. 27, 2022; 11 pages; Commissioner for Patents.

Rodrigo et al; "Mid-infrared plasmonic biosensing with graphene"; Science 2015, vol. 349, Issue 6244, pp. 165-168.

Wittmann et al; "Dielectric surface charge engineering for electrostatic doping of graphene"; ACS Appl. Electron. Mater. 2020, 2, pp. 1235-1242.

Xia et al; "Graphene field-effect transistors with high on/off current radio and large transport band gap at room temperature"; Nano Lett. 2010, 10, 2, pp. 715-718.

Yoon et al., "Controllable Phosphorus Doped Graphene Field Effect Transistor using Phospho-Silicate Glass Films" ECS Transactions, vol. 64, Issue 38, 2015, pp. 31-36.

Chinese Patent Application No. 202280066319.7, Office Action dated Feb. 27, 2026, 4 pages (English Translation only), Chinese Patent Office.

* cited by examiner

A.

B.

GLASS ARTICLE COMPRISING N-DOPED GRAPHENE

This application claims the benefit of priority under 35 U.S.C. § 371 of International Application No. PCT/US2022/038753, filed on Jul. 29, 2022, which claims the benefit of priority under 35 U.S.C § 119 of U.S. Provisional Application Ser. No. 63/228,825 filed on Aug. 3, 2021 the content of which is relied upon and incorporated herein by reference in its entirety.

FIELD

The disclosure relates to a glass article comprising n-doped graphene on at least one surface thereof and a method of making the same.

BACKGROUND

In the field of electronics, the absence of a bandgap in pristine graphene presents a challenge in switching off field-effect transistor (FET) devices. This is due to the low ratio (e.g., below 100) between the on and off state currents (ION/IOFF; e.g., higher performance of the device at lower leakage power; compare a ratio of 100 for graphene-based FET to a ratio of approximately 104-107 for silicon. In optics, it is known that graphene at around its neutrality point (e.g., little intrinsic doping), does not support any significant plasmons. But graphene can support significant plasmons by changing the doping (Fermi level) using electrostatic fields, with the caveat that this is limited by the dielectric breakdown of the layer across which the field is applied.

Graphene can be grown on a metal film such as copper or nickel. After growth, it is transferred onto a substrate of choice such as $SiO_x/Si$, high performance fused silica (HPFS) or glass for device fabrication. When transferred onto a substrate, graphene becomes doped due to its interaction with the surface. For example, on HPFS, graphene becomes p-doped with a carrier density on the order of $10^{12}$ $cm^{-2}$. This effect has been widely demonstrated in literature when graphene is transferred to glass, a process which, together with the PMMA residues left after the wet-transfer method, induces p-doping to the graphene as the glass has a potentially negative charge due to the hydroxyl groups on the surface. Doping after transfer on appropriately treated surfaces is thus a means to open bandgap and tune the Fermi level. This is the case where, e.g., ammonia and aluminum on an oxide surface diffuse, which induces positive ($NSiO^+$) and negative ($AlSiO^-$) charges on the oxide layer. Van der Pauw measurements show that the charge neutrality or Dirac voltage in graphene can be shifted from about −60 V ($n=-8.62\times10^{12}$ $cm^{-2}$) on standard $SiO_2$ to about 13 V ($n=2.17\times10^{12}$ $cm^{-2}$) on negatively doped $SiO_2$ layers by manipulating the surface charge.

SUMMARY

As described herein, n-doped graphene with an unexpectedly high carrier density (e.g., on the order of about $10^{13}$ $cm^{-2}$ or higher) has been developed by placing graphene (e.g., pristine graphene) on an ion-exchanged glass surface. Such high n-doping levels in graphene simply due to interaction with a substrate underneath has never been observed before.

Impurities can be introduced during the glass's synthesis, e.g., from the concomitant modification of the glass properties during its synthesis. For example, modifiers can be introduced into glass during its synthesis, with Na and Ca atoms being those typical added (e.g., from $Na_2O$ and CaO, respectively).

The absence of modifiers in quartz and fused silica allows the strong covalent bond between each silicon to four oxygens, provides an extremely stable structure. On the contrary, the presence of modifiers, such as $Na^+$ in soda lime glass, causes weak ionic bonds, which allows the ions mobility at temperatures much lower than the glass transition temperature. The introduction of Na during the glass synthesis promotes the breaking of some Si—O—Si bridges, which leaves non-bridging oxygens in the glass network. As a result, these oxygens will be anions ($O^-$) corresponding to sodium cations ($Na^+$), which is incorporated at these locations.

In the case of ion-exchanged glasses, large ions can be introduced into the glass surface by ion exchange techniques. During this process, the glass is placed, e.g., in a hot bath of molten salt at approximately 400° C., which is a temperature where Na ions have enough mobility to leave the glass and are exchanged with K ions from the salt bath. This leads to a surface layer with high compressive stress in the ion-exchanged glass that provides its strength.

As described herein, ion-exchanged glass was found to naturally modify graphene doping without the need of additional post-treatment (e.g., thermal poling under applied potential). Sheet resistance and Hall measurements performed at room temperature demonstrate the high doping levels of graphene placed in direct contact with ion-exchanged glass leads to graphene with an unexpectedly high carrier density (e.g., on the order of about $10^{13}$ $cm^{-2}$ or higher). The negative values obtained with ion-exchanged glass were found to be orders of magnitude larger than the positive values on native silica or the glass before ion-exchange.

BRIEF DESCRIPTION OF THE DRAWINGS

These and other features, aspects, and advantages of the present technology will become better understood with regard to the following drawings.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION

This disclosure is not limited to the specific compositions, articles, devices, and methods described herein unless otherwise specified. It is also to be understood that the terminology used herein is for the purpose of describing particular aspects only and is not intended to be limiting.

Figure 1:
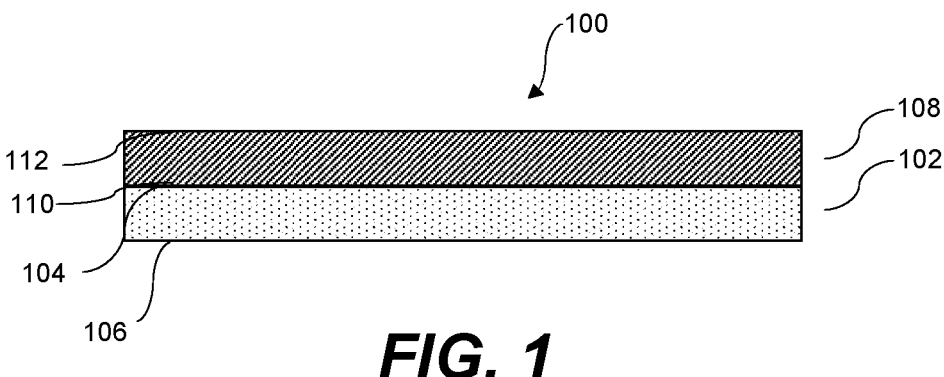
FIGS. 1-6 are cross-sectional views of several examples of glass articles 100-500, respectively.

Making reference to FIG. 1, the disclosure relates to a glass article 100 comprising: an ion-exchanged glass layer 102 comprising an ion-exchanged glass layer first major surface 104 and an ion-exchanged glass layer second major surface 106 opposite the ion-exchanged glass layer first major surface; and at least one negatively doped graphene layer 108 having a negatively doped graphene layer first major surface 110 and a negatively doped graphene layer second major surface 112 opposite the negatively doped graphene layer first major surface; the negatively doped graphene layer first major surface 110 located opposite at least a portion of at least one of the first major surface 104 and the second major surface 106 of the ion-exchanged glass layer 102, the negatively doped graphene layer having a carrier density of at least about $10^{13}$ cm$^{-2}$; at least about $10^{14}$ cm$^{-2}$; or at least $10^{15}$ cm$^{-2}$. For example, the negatively doped graphene layer 108 can have a carrier density of about $10^{13}$ cm$^{-2}$ to about $10^{15}$ cm$^{-2}$; about $10^{13}$ cm$^{-2}$ to about $10^{14}$ cm$^{-2}$; about $10^{12}$ cm$^{-2}$ to about $10^{13}$ cm$^{-2}$ or about $10^{13}$ cm$^{-2}$ to about $10^{14}$ cm$^{-2}$.

Figure 2:
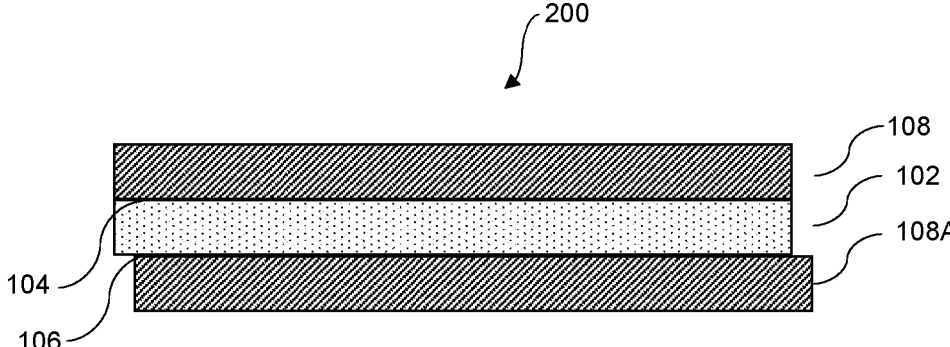

FIG. 2 is an example where a glass article 200 comprises two negatively doped graphene layers, one located opposite at least a portion of the first major surface 104 of ion-exchanged glass layer 102 and a second negatively doped graphene layer 108A located opposite at least a portion of the second major surface 106 of the ion-exchanged glass layer 102.

Figure 3:
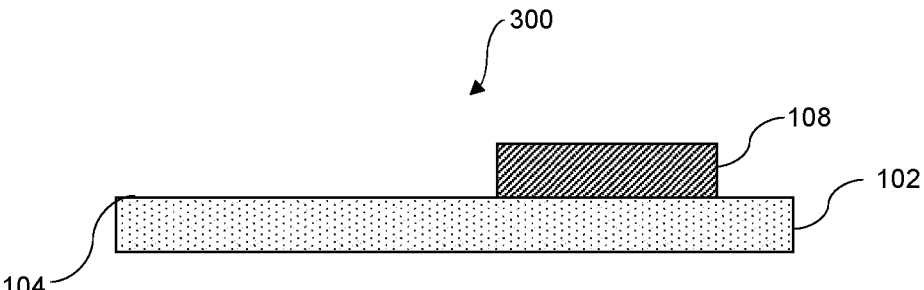

FIG. 3 is an example relates to a glass article 300 comprising: an ion-exchanged glass layer 102; and a negatively doped graphene layer 108, wherein the negatively doped graphene layer 108 covers less than the entire first major surface 104 of ion-exchanged glass layer 102.

Figure 4:
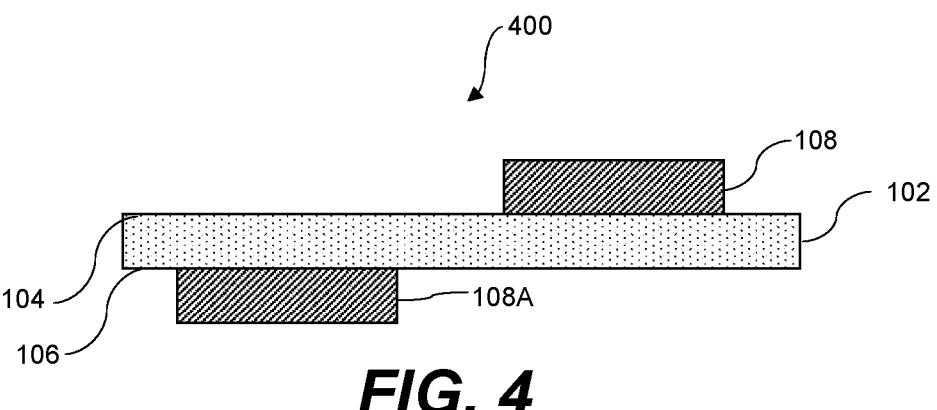

FIG. 4 is an example where a glass article 400 comprises two negatively doped graphene layers, one located opposite at least a portion of the first major surface 104 of ion-exchanged glass layer 102 and a second negatively doped graphene layer 108A located opposite at least a portion of the second major surface 106 of the ion-exchanged glass layer 102.

Figure 5:
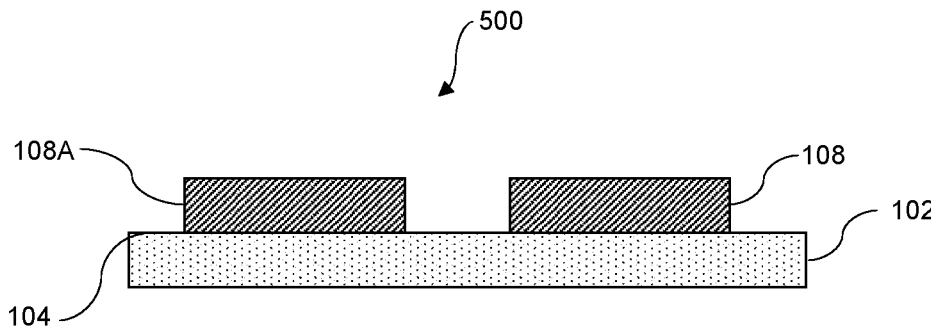

FIG. 5 is an example where a glass article 500 comprises a plurality (e.g., two) of negatively doped graphene layers 108 and 108A, each negatively doped graphene layer located on at least a portion of the first major surface 104 of ion-exchanged glass layer 102.

As is the case with the example in FIG. 1, the negatively doped graphene layers described in FIGS. 2-5 have a carrier density of at least about $10^{13}$ cm$^{-2}$; at least about $10^{14}$ cm$^{-2}$; or at least $10^{15}$ cm$^{-2}$. For example, the negatively doped graphene layer 108 can have a carrier density about $10^{13}$ cm$^{-2}$ to about $10^{15}$ cm$^{-2}$; about $10^{13}$ cm$^{-2}$ to about $10^{14}$ cm$^{-2}$; about $10^{12}$ cm$^{-2}$ to about $10^{13}$ cm$^{-2}$ or about $10^{13}$ cm$^{-2}$ to about $10^{14}$ cm$^{-2}$. And where there is a plurality of negatively doped graphene layers (e.g., two, three, four or more; e.g., 108 and 108A in FIGS. 2, 4, and 5), each negatively doped graphene layer can have the same or different carrier density.

The negatively doped graphene layers described herein can have other suitable electrical properties, including a sheet resistance of from about 200 Ω/sq to about 500 Ω/sq (e.g., about 200 Ω/sq to about 300 Ω/sq; about 250 Ω/sq to about 400 Ω/sq; about 300 Ω/sq to about 400 Ω/sq; about 400 Ω/sq to about 500 Ω/sq; about 250 Ω/sq to about 350 Ω/sq; or about 200 Ω/sq to about 250 Ω/sq); an electron mobility of from about 80 cm$^2$/V·s to about 800 cm$^2$/V·s (e.g., about 80 cm$^2$/V·s to about 500 cm$^2$/V·s; about 200 cm$^2$/V·s to about 500 cm$^2$/V·s; 150 cm$^2$/V·s to about 250 cm$^2$/V·s; 200 cm$^2$/V·s to about 400 cm$^2$/V·s; 150 cm$^2$/V·s to about 250 cm$^2$/V·s; or about 500 cm$^2$/V·s to about 800 cm$^2$/V·s) or both a sheet resistance of from about 200 Ω/sq to about 500 Ω/sq (e.g., about 200 Ω/sq to about 300 Ω/sq; about 250 Ω/sq to about 400 Ω/sq; about 300 Ω/sq to about 400 Ω/sq; about 400 Ω/sq to about 500 Ω/sq; about 250 Ω/sq to about 350 Ω/sq; or about 200 Ω/sq to about 250 Ω/sq) and an electron mobility of from about 80 cm$^2$/V·s to about 800 cm$^2$/V·s (e.g., about 80 cm$^2$/V·s to about 500 cm$^2$/V·s; about 200 cm$^2$/V·s to about 500 cm$^2$/V·s; 150 cm$^2$/V·s to about 250 cm$^2$/V·s; 200 cm$^2$/V·s to about 400 cm$^2$/V·s; 150 cm$^2$/V·s to about 250 cm$^2$/V·s; or about 500 cm$^2$/V·s to about 800 cm$^2$/V·s).

The examples provided in FIGS. 1-6 are examples of glass articles where a negatively doped graphene layer first major surface is in direct contact with at least a portion of at least one of the ion-exchanged glass layer first major surface and the ion-exchanged glass layer second major surface. But examples are contemplated where there can be an intermediate layer (or a plurality of intermediate layers; not shown) between at least a portion of the negatively doped graphene layer first major surface and at least a portion of at least one of the first major surface and the second major surface of the ion-exchanged glass layer. Such intermediate layer(s) can be used to provide additional features to the glass articles described herein (e.g., reflection resistance or anti-reflection properties, glare resistance or anti-glare properties, color, opacity, and/or the like) and can cover a portion of the ion-exchanged glass layer or the entire the ion-exchanged glass layer (e.g., both the first major surface and the second major surface of the ion-exchanged glass layer). Examples of intermediate layers include a coating of SiO$_2$ nanoparticles bound to at least a portion of the first major surface and the second major surface of the ion-exchanged glass layer to provide reflection resistance to, e.g., the finished glass article. Or the intermediate layer can comprise a multilayered reflection-resistant coating formed from alternating layers of polycrystalline TiO$_2$ and SiO$_2$. Or the intermediate layer can comprise a color-providing composition that comprises a dye or pigment material.

In general, the intermediate layer, when present, can be fabricated independently using any of the variants of chemical vapor deposition (CVD) (e.g., plasma-enhanced CVD, aerosol-assisted CVD, metal organic CVD, and the like), any of the variants of physical vapor deposition (PVD) (e.g., ion-assisted PVD, pulsed laser deposition, cathodic arc deposition, sputtering, and the like), spray coating, spin-coating, dip-coating, inkjetting, sol-gel processing, or the like. Such processes are known to those skilled in the art to which this disclosure pertains.

Any of the negatively doped graphene layers described herein can have any suitable thickness. For example, negatively doped graphene layers described herein can have a thickness of about 1 nm or less. In some instances, the negatively doped graphene layers described herein have a thickness of about 0.1 nm to about 1 nm (e.g., from about 0.1 nm to about 0.5 nm, about 0.5 nm to about 1 nm; about 0.1 nm to about 0.9 nm; about 0.25 nm to about 0.75 nm; about 0.25 nm to about 0.5 nm; or about 0.6 nm to about 1 nm).

The negatively doped graphene layer or layers described herein can be located on a ion-exchanged glass layers by any suitable method known in the art, including graphene transfer by a wet etching process with or without post-annealing. The ion-exchanged glass layer can be cleaned with any suitable solvent before graphene transfer.

The graphene used to prepare the negatively doped graphene layers described herein can be prepared by any method known in the art, e.g., grown on copper by chemical vapor deposition (CVD) technique and transferred to an ion-exchanged glass layer through a polymethyl methacrylate (PMMA)-based transfer process where an additional annealing step can be added to enhance the cleaning of the sample.

Although the negatively doped graphene layers described herein are depicted in FIGS. 1-6 as single layers the negatively doped graphene layer can comprise a graphene stack comprising two or more graphene layers (e.g., two or three layers) located substantially one on top of another. In a stack, the total thickness of the layer can still be about 1 nm or less. In some instances, the negatively doped graphene stack can have a thickness of about 0.3 nm to about 1 nm (e.g., from about 0.3 nm to about 0.5 nm, about 0.5 nm to about 1 nm; about 0.3 nm to about 0.9 nm; about 0.3 nm to about 0.75 nm; or about 0.6 nm to about 1 nm).

The ion-exchanged glass layers described herein can be prepared using any suitable processes, including an ion-exchange process including, among other things, immersion of a glass or glass-ceramic material into a molten salt bath for a predetermined period of time, ions at or near the surface(s) of the glass or glass-ceramic material are exchanged for larger metal ions from the salt bath. In one embodiment, the temperature of the molten salt bath is in the range from about 400° C. to about 430° C. and the predetermined time period is about four to about twenty four hours; however the temperature and duration of immersion may vary according to the composition of the material and the desired strength attributes. The incorporation of the larger ions into the glass or glass-ceramic material strengthens the material by creating a compressive stress in a near surface region or in regions at and adjacent to the surface(s) of the material. A corresponding tensile stress is induced within a central region or regions at a distance from the surface(s) of the material to balance the compressive stress. Glass or glass-ceramic materials utilizing this strengthening process can be described more specifically as chemically-strengthened or ion-exchanged glass or glass-ceramic materials.

In one example, sodium ions in a strengthened glass or glass-ceramic material are replaced by potassium ions from the molten bath, such as a potassium nitrate salt bath, though other alkali metal ions having larger atomic radii, such as rubidium or cesium, can replace smaller alkali metal ions in the glass. According to particular embodiments, smaller alkali metal ions in the glass or glass-ceramic can be replaced by Ag+ ions. Similarly, other alkali metal salts such as, but not limited to, sulfates, phosphates, halides, and the like can be used in the ion exchange process.

While not wishing to be bound by any specific theory, it is believed that the negative doping of the negatively doped graphene layer is induced by the ion-exchanged glass layer. For example, the negative doping of the negatively doped graphene layer is induced by positively charged ions present in the ion-exchanged glass layer. The positively charged ions comprise positively charged alkali metal ions. The positively charged ions can comprise potassium ions (K+).

The replacement of smaller ions by larger ions at a temperature below that at which the glass network can relax produces a distribution of ions across the surface(s) of the strengthened material that results in a stress profile. The larger volume of the incoming ion produces a compressive stress (CS) on the surface and tension (central tension, or CT) in the center of the strengthened material. The compressive stress is related to the central tension by the following relationship:

$$CS = CT\left(\frac{t - 2DOL}{DOL}\right)$$

where t is the total thickness of the strengthened glass or glass-ceramic material and compressive depth of layer (DOL), also referred to herein as depth of compressive layer, is the depth of ion exchange (e.g., an ion exchanged depth of layer present on at least one surface of the ion-exchanged glass layers described herein). Depth of exchange can be described as the depth within the strengthened glass or glass-ceramic material (i.e., the distance from a surface of the glass material to a central region of the glass or glass-ceramic material), at which ion exchange facilitated by the ion exchange process takes place.

A strengthened glass or glass-ceramic material used as the ion-exchanged glass layers described herein, can have a surface compressive stress of about 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened glass or glass-ceramic material may have a compressive depth of compressive layer of about 15 μm or greater, 20 μm or greater (e.g., 25 μm, 30 μm, 35 μm, 40 μm, 45 μm, 50 μm or greater; or 1 μm to 100 μm, such as 5 μm to 50 μm) and/or a central tension of about 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). The strengthened glass or glass-ceramic material used as the ion-exchanged glass layers described herein can have one or more of the following: a surface compressive stress greater than about 200 MPa, a depth of compressive layer greater than about 15 μm, and a central tension greater than about 18 MPa.

Any number of glass compositions can be employed in the glass material (e.g., a glass material used to prepare the ion-exchanged glass layers described herein) and include alkali aluminosilicate glass compositions or alkali alumino-borosilicate glass compositions, though other glass compositions are contemplated. Such glass compositions may be characterized as ion exchangeable. As used herein, "ion exchangeable" means that a material comprising the composition is capable of exchanging cations located at or near the surface of the material with cations of the same valence that are either larger or smaller in size.

For example, a suitable glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt.

%. Suitable glass compositions, in some embodiments, further comprise at least one of K$_2$O, MgO, and CaO. In a particular embodiment, the glass can comprise 61-75 mol. % SiO$_2$; 7-15 mol. % Al$_2$O$_3$; 0-12 mol. % B$_2$O$_3$; 9-21 mol. % Na$_2$O; 0-4 mol. % K$_2$O; 0-7 mol. % MgO; and 0-3 mol. % CaO.

A further example glass composition suitable for forming hybrid glass laminates comprises: 60-70 mol. % SiO$_2$; 6-14 mol. % Al$_2$O$_3$; 0-15 mol. % B$_2$O$_3$; 0-15 mol. % Li$_2$O; 0-20 mol. % Na$_2$O; 0-10 mol. % K$_2$O; 0-8 mol. % MgO; 0-10 mol. % CaO; 0-5 mol. % ZrO$_2$; 0-1 mol. % SnO$_2$; 0-1 mol. % CeO$_2$; less than 50 ppm As$_2$O$_3$; and less than 50 ppm Sb2O3; where 12 mol. %≤(Li$_2$O+Na$_2$O+K$_2$O)≤20 mol. % and 0 mol. %≤(MgO+CaO)≤10 mol. %.

A still further example glass composition comprises: 63.5-66.5 mol. % SiO$_2$; 8-12 mol. % Al$_2$O$_3$; 0-3 mol. % B$_2$O$_3$; 0-5 mol. % Li$_2$O; 8-18 mol. % Na$_2$O; 0-5 mol. % K$_2$O; 1-7 mol. % MgO; 0-2.5 mol. % CaO; 0-3 mol. % ZrO$_2$; 0.05-0.25 mol. % SnO$_2$; 0.05-0.5 mol. % CeO$_2$; less than 50 ppm As$_2$O$_3$; and less than 50 ppm Sb2O3; where 14 mol. %≤(Li$_2$O+Na$_2$O+K$_2$O)≤18 mol. % and 2 mol. %≤(MgO+CaO)≤7 mol. %.

Another example of a glass composition comprises an alkali aluminosilicate glass comprises, consists essentially of, or consists of: 61-75 mol. % SiO$_2$; 7-15 mol. % Al$_2$O$_3$; 0-12 mol. % B$_2$O$_3$; 9-21 mol. % Na$_2$O; 0-4 mol. % K$_2$O; 0-7 mol. % MgO; and 0-3 mol. % CaO.

Yet another example of a glass compositions comprises alkali aluminosilicate glass comprises alumina, at least one alkali metal and, in some embodiments, greater than 50 mol. % SiO$_2$, in other embodiments at least 58 mol. % SiO$_2$, and in still other embodiments at least 60 mol. % SiO$_2$, wherein the ratio:

$$(Al_2O_3 + B_2O_3)/\sum \text{modifiers} > 1$$

where in the ratio the components are expressed in mol. % and the modifiers are alkali metal oxides. This glass, in particular embodiments, comprises, consists essentially of, or consists of: 58-72 mol. % SiO$_2$; 9-17 mol. % Al$_2$O$_3$; 2-12 mol. % B$_2$O$_3$; 8-16 mol. % Na$_2$O; and 0-4 mol. % K$_2$O, wherein the ratio:

$$(Al_2O_3 + B_2O_3)/\sum \text{modifiers} > 1$$

Yet another example of a suitable glass compositions includes a composition comprising, consisting essentially of, or consisting of: 60-70 mol. % SiO$_2$; 6-14 mol. % Al$_2$O$_3$; 0-15 mol. % B$_2$O$_3$; 0-15 mol. % Li$_2$O; 0-20 mol. % Na$_2$O; 0-10 mol. % K$_2$O; 0-8 mol. % MgO; 0-10 mol. % CaO; 0-5 mol. % ZrO$_2$; 0-1 mol. % SnO$_2$; 0-1 mol. % CeO$_2$; less than 50 ppm As$_2$O$_3$; and less than 50 ppm Sb$_2$O$_3$; wherein 12 mol. %≤Li$_2$O+Na$_2$O+K$_2$O≤20 mol. % and 0 mol. %≤MgO+CaO≤10 mol. %.

Yet another example of a suitable glass compositions includes an alkali aluminosilicate glass comprises, consists essentially of, or consists of: 64-68 mol. % SiO$_2$; 12-16 mol. % Na$_2$O; 8-12 mol. % Al$_2$O$_3$; 0-3 mol. % B$_2$O$_3$; 2-5 mol. % K$_2$O; 4-6 mol. % MgO; and 0-5 mol. % CaO, wherein: 66 mol. %≤SiO$_2$+B$_2$O$_3$+CaO≤69 mol. %; Na$_2$O+K$_2$O+B$_2$O$_3$+MgO+CaO+SrO>10 mol. %; 5 mol. %≤MgO+CaO+SrO≤8 mol. %; (Na$_2$O+B$_2$O$_3$)≤Al$_2$O$_3$≤2 mol. %; 2 mol. %≤Na$_2$O≤Al$_2$O$_3$≤6 mol. %; and 4 mol. %≤(Na$_2$O+K$_2$O)

≤Al$_2$O$_3$≤10 mol. %. Additional examples for generating ion exchangeable glass structures are described in Published U.S. Appl. No. US 2014-0087193 A1 and U.S. Pat. No. 9,387,651 the entirety of each being incorporated herein by reference.

In an alternative embodiment, the glass material comprises an alkali aluminosilicate glass composition comprising: 2 mol % or more of Al$_2$O$_3$ and/or ZrO$_2$, or 4 mol % or more of Al$_2$O$_3$ and/or ZrO$_2$.

Glass-ceramic materials can be used in connection with the ion-exchanged glass layers described herein and can be fusion-formed or formed by other known methods such as rolling, thin-rolling, slot draw or float.

Glass-ceramics that can be used can be characterized by the processes by which they can be formed. Such glass-ceramics can be formed by float processes, fusion processes, slot draw process, thin rolling processes, or a combination thereof. Some glass-ceramics tend to have liquid viscosities that preclude the use of high throughput forming methods such as float, slot draw, or fusion draw. For example, some known glass-ceramics are formed from precursor glasses having liquidus viscosities of about 10 kP, which are not suitable for fusion draw, where liquidus viscosities of above about 100 kP or above about 200 kP are generally required. Glass-ceramics formed by the low throughput forming methods (e.g., thin rolling) may exhibit enhanced opacity, various degrees of translucency, and/or surface luster. Glass-ceramics formed by high throughout methods (e.g., float, slot draw, or fusion draw) can achieve very thin layers. Glass-ceramics formed by fusion draw methods may achieve pristine surfaces and thinness (e.g., about 2 mm or less). Examples of suitable glass-ceramics can include Li$_2$O—Al$_2$O$_3$—SiO$_2$ system (i.e. LAS-System) glass-ceramics, MgO—Al$_2$O$_3$—SiO$_2$ system (i.e. MAS-System) glass-ceramics, glass-ceramics including crystalline phases of any one or more of mullite, spinel, a-quartz, β-quartz solid solution, petalite, lithium disilicate, β-spodumene, nepheline, and alumina, and combinations thereof.

The ion-exchanged glass layers described herein can have any suitable thickness, such as a thickness of about 2 mm or less. In some instances, ion-exchanged glass layers described herein have a thickness of about 0.1 mm to about 2 mm (e.g., from about 0.1 mm to about 0.5 mm, from about 0.1 mm to about 0.3 mm, from about 0.1 mm to about 0.25 mm, from about 0.3 mm to about 1 mm, from about 0.2 mm to about 0.5 mm, or from about 0.5 mm to about 2 mm).

The combination of thicknesses for an ion-exchanged glass layer and a negatively doped graphene layer can include but are not limited to 0.5 mm/0.1 nm, 1 mm/1 nm, 0.5 mm/0.5 nm, 1 mm/0.1 nm, or 0.1 mm/0.3 nm.

Figure 6:
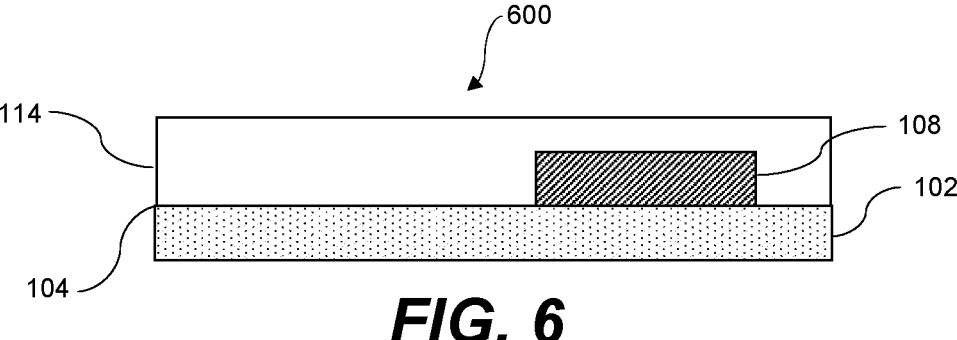

The glass articles described herein can further comprise an encapsulation layer substantially encapsulating the negatively doped graphene layer. FIG. 6 shows one example of a glass article 600 comprising negatively doped graphene layer 108, ion-exchanged glass layer 102, and encapsulation layer 114. The encapsulation layer 114 can substantially cover the first major surface 104 of the ion-exchanged glass layer 102 as shown in FIG. 6 or can substantially encapsulate the negatively doped graphene layer 108 without substantially covering the first major surface 104 of the ion-exchanged glass layer 102 (not shown).

The encapsulation layer can be made of any suitable material, such as Al$_2$O$_3$ deposited by atomic layer deposition methods known in the art. Other suitable materials for the encapsulation layer include, but are not limited to, silicon nitride, aluminum nitride, zirconium nitride, titanium nitride, hafnium nitride, tantalum nitride, silicon oxide, aluminum oxide, or titanium oxide. For example, the encapsulation layer can be formed of $SiO_2$, $Al_2O_3$, SiON, or $SiN_x$.

Devices comprising the glass articles described herein are also contemplated herein. The glass articles described herein are scalable to any size for any device ranging from a wearable device to a desktop device and can be a subcomponent of a larger system that uses the properties of glass in some relevant way. Examples of devices that could comprise the glass articles described herein include an electronic device, an optical device or an optoelectronic device.

Figure 7:
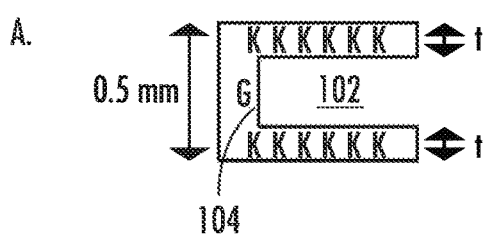
FIG. 7 is a scheme is a perspective view of an electronic device 120 incorporating the glass articles described herein and an example of a method for its fabrication.
Figure 7:
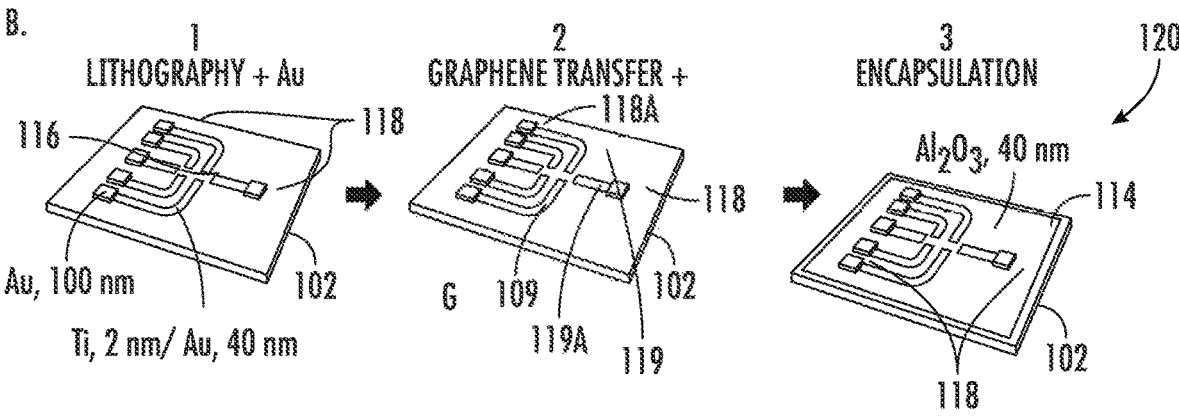

FIG. 7 is a perspective view of an electronic device 120 incorporating the glass articles described herein and an example of a method for its fabrication. With reference to FIG. 7, panel (a) shows an ion-exchanged glass layer 102 where first major surface 104 and a second major surface ment of R was first obtained followed by the Hall measurement to evaluate the level of carrier density and electron mobility.

Figure 8:
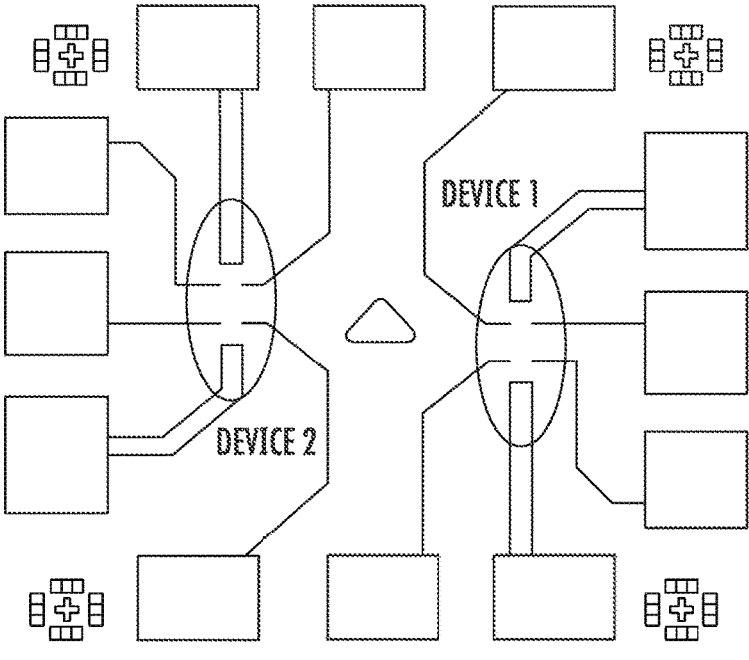
FIG. 8 is a top view of lithography pattern of a sample showing two devices (Device 1 and Device 2, respectively) that were fabricated per ion-exchanged glass layer. In total, there were eight samples with 16 negatively doped graphene layers.

Eight samples on ion-exchanged glass layer of varying thicknesses were prepared (see, e.g., FIG. 8), each one containing two Hall bars per sample in order to have statistics on the results. Results were collected in the Table 1. The ion-exchanged thickness referenced in Table 1 is the one corresponding to the thickness of the ion-exchanged layer at the ion-exchanged glass layer first major surface that has been ion exchanged. But it should be understood that the thickness of the ion-exchanged layer at the ion-exchanged glass layer second major surface that has been ion exchanged will be similar to the thickness of the ion-exchanged layer at the ion-exchanged glass layer first major surface that has been ion exchanged.

TABLE 1

| IOX thickness [μm] Top face, (total) | Sample | R [Ohms/sq] | Ns [cm$^{-2}$] | μ [cm$^2$/V · s] |
|---|---|---|---|---|
| 1, (2) | 1 | 333.2, Device 1 | −2.1 E14 | 183 |
| | | 366.2, Device 2 | −4.5 E14 | 80 |
| 5, (10) | 2 | 460, Device 1 | −1.59 E14 | 178 |
| | | 442, Device 2 | −1.28 E14 | 231 |
| 10, (20) | 3 | 300, Device 1 | −1.9 E14 | 227 |
| | | 340, Device 2 | −1.5 E14 | 252 |
| | 4 | 356.7, Device 1 | −8 E13 | 455 |
| | | 274.4, Device 2 | −2 E14 | 233 |
| 20, (40) | 5 | 215, Device 1 | −2.5 E14 | 240 |
| | | 420, Device 2 | −1.7 E14 | 180 |
| | 6 | 226, Device 1 | −2.87 E14 | 200 |
| | | 209, Device 2 | −3.07 E14 | 203 |
| 43, (86) | 7 | 267, Device 1 | −6.17 E13 | 790 |
| | | 227, Device 2 | −7.91 E13 | 725 |
| | 8 | 387, Device 1 | −7.83 E13 | 430 |
| | | 302, Device 2 | −1.77 E14 | 244 |

106 (not shown) contain $K^+$ from an ion exchange procedure, which thickness (t) can be modified from 5 to 50 μm. Panel (b) of FIG. 7 shows the procedure for the fabrication of a graphene device: (1) initial cleaning of an ion-exchanged glass layer 102 using any suitable organic solvent, UV lithography and evaporation of the metal contacts—the first one for the Hall bar 116 and the second to increase the thicknesses of first contact 118 and second contact 118A; (2) graphene 109 transfer by wet etching process and post-annealing. A third lithography for graphene 109 patterning to the Hall bar area, removing the excess by, e.g., reactive ion etching (RIE). (3) Encapsulation with $Al_2O_3$ by atomic layer deposition (ALD) gives electronic device 120, where the graphene 109 at one point becomes negatively doped through contact with the ion-exchanged glass layer to form the negatively doped graphene layer 108. FIG. 7 also shows a first contact 118 and a second contact 118A located on the ion-exchanged glass layer 102, the first contact 118 and the second contact 118A electrically coupled via the negatively doped graphene layer. (not shown). First contact 118 can be electrically coupled to a first trace 119 and a second contact 118A can be electrically coupled to a second trace 119A, the first trace 119 and the second trace 119 A electrically coupled via the negatively doped graphene layer (not shown), wherein the first contact 118, the first trace 119, the second contact 118A, and the second trace 119A are each located on the ion-exchanged glass layer 102.

Figure 9:
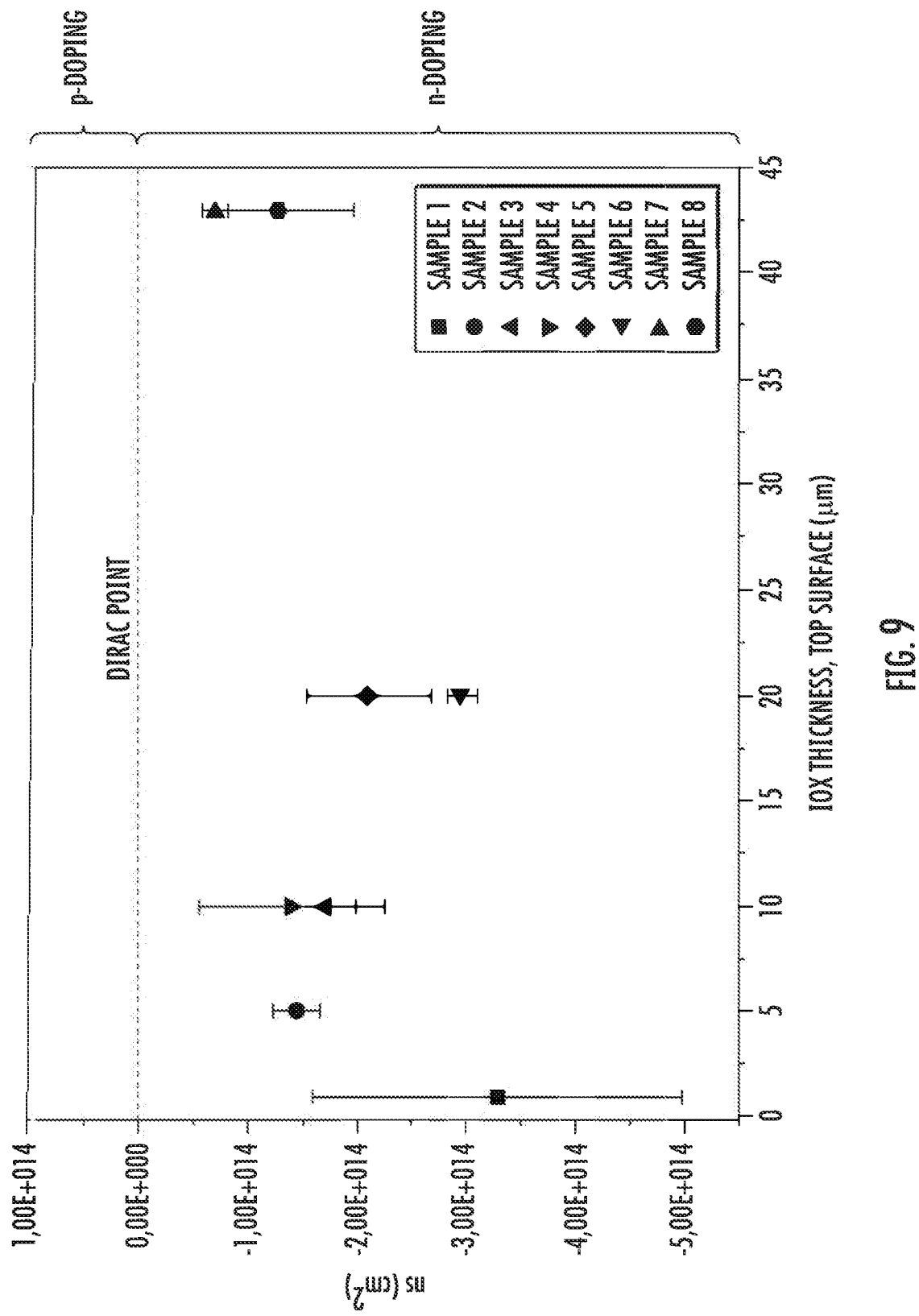
FIG. 9 is a plot of carrier density as a function of ion-exchanged thickness on an ion-exchanged glass layer. The figure shows the evolution of graphene doping for eight samples when ion-exchanged thickness of an ion-exchanged glass layer is increased from one to 43 microns (corresponding to the top surface of the ion-exchanged glass layer. The bottom face of the ion-exchanged glass layer has equal ion-exchanged thickness). Dirac point at 0 (yellow area) separates the p-doping area (top green) from the n-doping (bottom red).

Electrical measurements were performed using devices such as the one depicted in FIG. 7 to obtain the sheet resistance (R), and the carrier density (Ns), and electron mobility (μH), respectively. In one example the measure- The sheet resistance of several devices was measured again after four months revealing an increase between 100-160 O/sq, which still denotes a high level doping of graphene over time. FIG. 9 shows the results obtained for samples 1-8, showing the graphene doping (y-axis) obtained when modifying the ion-exchanged glass layer thickness (x-axis). Results lay in the n-doping region at high levels within the range: $-10^{14}$ to $-3 \cdot \times 10^{14}$ cm$^{-2}$. All of the samples show a strong n-doping if compared to the usual doping values of graphene when it is transferred to standard substrates as fused silica, where doping levels are within the range $10^{12}$.

While this description can include many specifics, these should not be construed as limitations on the scope thereof, but rather as descriptions of features that can be specific to particular embodiments. Certain features that have been heretofore described in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and can even be initially claimed as such, one or more features from a claimed combination can in some cases be excised from the combination, and the claimed combination can be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing can be advantageous.

In the foregoing description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "substantially no" as used herein refers to less than about 30%, 25%, 20%, 15%, 10%, 5%, 3%, 2%, 1%, 0.5%, 0.1%, 0.05%, 0.001%, or at less than about 0.0005% or less or about 0% or 0%.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

Although the disclosure herein refers to certain illustrated embodiments, it is to be understood that these embodiments are presented by way of example and not by way of limitation.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

The following embodiments are provided, the numbering of which is not to be construed as designating levels of importance:

Embodiment 1 relates to a glass article comprising: an ion-exchanged glass layer comprising an ion-exchanged glass layer first major surface and an ion-exchanged glass layer second major surface opposite the ion-exchanged glass layer first major surface; and at least one negatively doped graphene layer having a negatively doped graphene layer first major surface and a negatively doped graphene layer second major surface opposite the negatively doped graphene layer first major surface; the negatively doped graphene layer first major surface located opposite at least a portion of at least one of the first major surface and the second major surface of the ion-exchanged glass layer, the negatively doped graphene layer having a carrier density of at least about $10^{13}$ cm$^{-2}$.

Embodiment 2 relates to the glass article of Embodiment 1, wherein the negatively doped graphene layer has a carrier density of about $10^{13}$ cm$^{-2}$ to about $10^{15}$ cm$^{-2}$.

Embodiment 3 relates to the glass article of Embodiments 1-2, wherein the negatively doped graphene layer has a sheet resistance of from about 200 Ω/sq to about 500 Ω/sq.

Embodiment 4 relates to the glass article of Embodiments 1-3, wherein the negatively doped graphene layer has an electron mobility of from about 80 cm2/V·s to about 800 cm2/V·s.

Embodiment 5 relates to the glass article of Embodiments 1-4, wherein an intermediate layer is located between at least a portion of the negatively doped graphene layer first major surface and at least a portion of at least one of the ion-exchanged glass layer first major surface and the ion-exchanged glass layer second major surface.

Embodiment 6 relates to the glass article of Embodiments 1-5, wherein at least a portion of at least one of the ion-exchanged glass layer first major surface and the ion-exchanged glass layer second major surface comprises an ion exchanged depth of compressive layer.

Embodiment 7 relates to the glass article of Embodiments 1-5, wherein at least a portion of the ion-exchanged glass layer first major surface or the ion-exchanged glass layer second major surface comprises an ion exchanged depth of compressive layer.

Embodiment 8 relates to the glass article of Embodiments 1-7, wherein the negatively doped graphene layer first major surface is in direct contact with at least a portion of at least one of the ion-exchanged glass layer first major surface and the ion-exchanged glass layer second major surface.

Embodiment 9 relates to the glass article of Embodiments 1-8, wherein the negative doping of the negatively doped graphene layer is induced by the ion-exchanged glass layer.

Embodiment 10 relates to the glass article of Embodiment 9, wherein the negative doping of the negatively doped graphene layer is induced by positively charged ions present in the ion-exchanged glass layer.

Embodiment 11 relates to the glass article of Embodiment 10, wherein the positively charged ions comprise alkali metal ions.

Embodiment 12 relates to the glass article of Embodiment 10 or 11, wherein the positively charged ions comprise potassium ions.

Embodiment 13 relates to the glass article of Embodiments 1-12, wherein the negatively doped graphene layer comprises a single negatively doped graphene layer.

Embodiment 14 relates to the glass article of Embodiments 1-12, wherein the negatively doped graphene layer comprises a graphene stack.

Embodiment 15 relates to the glass article of Embodiments 1-14, wherein the negatively doped graphene layer has a thickness of from about 0.1 nm to about 1 nm.

Embodiment 16 relates to the glass article of Embodiments 1-15, wherein the ion-exchanged glass layer has a thickness from about 0.1 mm to about 2 mm.

Embodiment 17 relates to the glass article of Embodiments 1-16, wherein the ion-exchanged glass layer is an ion-exchanged alkali aluminosilicate glass composition or an ion-exchanged alkali aluminoborosilicate glass composition.

Embodiment 18 relates to the glass article of Embodiments 1-17, further comprising an encapsulation layer substantially encapsulating the negatively doped graphene layer.

Embodiment 19 relates to the glass article of Embodiment 18, wherein the encapsulation layer comprises silicon nitride, aluminum nitride, zirconium nitride, titanium nitride, hafnium nitride, tantalum nitride, silicon oxide, aluminum oxide, or titanium oxide.

Embodiment 20 relates to a device comprising the glass article of Embodiments 1-19.

Embodiment 21 relates to the device of Embodiment 20, wherein the device is an electronic device, an optical device or an optoelectronic device.

Embodiment 22 relates to the device of Embodiments 20-21, further comprising a first contact and a second contact located on the ion-exchanged glass layer, the first contact and the second contact electrically coupled via the negatively doped graphene layer.

Embodiment 23 relates to the device of Embodiments 20-22, further comprising a first contact electrically coupled to a first trace and a second contact electrically coupled to a second trace, the first trace and the second trace electrically coupled via the negatively doped graphene layer, wherein the first contact, the first trace, the second contact, and the second trace are each located on the ion-exchanged glass layer.

Embodiment 24 relates to a method of making the glass article of Embodiments 1-19, the method comprising: obtaining or providing an ion-exchanged glass layer comprising an ion-exchanged glass layer first major surface and an ion-exchanged glass layer second major surface; and locating a graphene layer on at least a portion of the ion-exchanged glass layer first major surface of to generate the at least one negatively doped graphene layer.

Embodiment 25 relates to the method of Embodiment 24, wherein the negatively doped graphene layer has a carrier density of about $10^{13}$ cm$^{-2}$ to about $10^{15}$ cm$^{-2}$.

Embodiment 26 relates to the method of Embodiments 24-25, wherein the negatively doped graphene layer has a sheet resistance of from about 200 Ω/sq to about 500 Ω/sq.

Embodiment 27 relates to the method of Embodiments 24-26, wherein the negatively doped graphene layer has an electron mobility of from about 80 cm$^2$/V·s to about 800 cm$^2$/V·s.

Embodiment 28 relates to the method of Embodiments 24-27 further comprising locating an intermediate layer between at least a portion of the negatively doped graphene layer first major surface and at least a portion of at least one of the ion-exchanged glass layer first major surface and the ion-exchanged glass layer second major surface Embodiment 29 relates to the method of Embodiments 24-28, wherein at least a portion of at least one of the ion-exchanged glass layer first major surface and the ion-exchanged glass layer second major surface comprises an ion exchanged depth of compressive layer.

Embodiment 30 relates to the method of Embodiments 24-29, wherein at least a portion of the ion-exchanged glass layer first major surface or the ion-exchanged glass layer second major surface comprises an ion exchanged depth of compressive layer.

Embodiment 31 relates to the method of Embodiments 24-30, wherein a negatively doped graphene layer first major surface is in direct contact with at least a portion of at least one of the ion-exchanged glass layer first major surface and the ion-exchanged glass layer second major surface.

Embodiment 32 relates to the method of Embodiments 24-31, wherein the negative doping of the negatively doped graphene layer is induced by the ion-exchanged glass layer.

Embodiment 33 relates to the method of Embodiments 24-32, wherein the positively charged ions present in the ion-exchanged glass layer induce negative doping of the negatively doped graphene layer.

Embodiment 34 relates to the method of Embodiment 33, wherein the positively charged ions comprise alkali metal ions.

Embodiment 35 relates to the method of Embodiments 24-34, wherein the positively charged ions comprise potassium ions.

Embodiment 36 relates to the method of Embodiments 24-35, wherein the negatively doped graphene layer comprises a single negatively doped graphene layer.

Embodiment 37 relates to the method of Embodiments 24-35, wherein the negatively doped graphene layer comprises a graphene stack.

Embodiment 38 relates to the method of Embodiments 24-37, wherein the negatively doped graphene layer has a thickness of from about 0.1 nm to about 1 nm.

Embodiment 39 relates to the method of Embodiments 24-38, wherein the ion-exchanged glass layer has a thickness from about 0.1 mm to about 2 mm.

Embodiment 40 relates to method of Embodiments 24-39, wherein the ion-exchanged glass wherein the ion-exchanged glass layer is an ion-exchanged alkali aluminosilicate glass composition or an ion-exchanged alkali aluminoborosilicate glass composition.

Embodiment 41 relates to the method of Embodiments 24-40, further comprising locating an encapsulation layer substantially encapsulating the negatively doped graphene layer.

Embodiment 42 relates to the method of Embodiment 41, wherein the encapsulation layer comprises silicon nitride, aluminum nitride, zirconium nitride, titanium nitride, hafnium nitride, tantalum nitride, silicon oxide, aluminum oxide, or titanium oxide.

What is claimed is:

1. A glass article comprising:
   an ion-exchanged glass layer comprising an ion-exchanged glass layer first major surface and an ion-exchanged glass layer second major surface opposite the ion-exchanged glass layer first major surface;
   a negatively doped graphene layer having a negatively doped graphene layer first major surface and a negatively doped graphene layer second major surface opposite the negatively doped graphene layer first major surface; and
   the negatively doped graphene layer first major surface located opposite at least a portion of at least one of the ion-exchanged glass layer first major surface or the ion-exchanged glass layer second major surface of the ion-exchanged glass layer, wherein the negatively doped graphene layer having has a carrier density of at least about $10^{13}$ cm$^{-2}$.

2. The glass article of claim 1, wherein the negatively doped graphene layer has a sheet resistance of from about 200 Ω/sq to about 500 Ω/sq.

3. The glass article of claim 1, wherein the negatively doped graphene layer has an electron mobility of from about 80 cm$^2$/V·s to about 800 cm$^2$/V·s.

4. The glass article of claim 1, wherein an intermediate layer is located between at least a portion of the negatively doped graphene layer first major surface and at least a portion of at least one of the ion-exchanged glass layer first major surface or the ion-exchanged glass layer second major surface.

5. The glass article of claim 1, wherein the negatively doped graphene layer first major surface is in direct contact with at least a portion of at least one of the ion-exchanged glass layer first major surface or the ion-exchanged glass layer second major surface.

6. The glass article of claim 1, wherein the negative doping of the negatively doped graphene layer is induced by positively charged ions present in the ion-exchanged glass layer.

7. The glass article of claim 1, wherein the negatively doped graphene layer has a thickness of from about 0.1 nm to about 1 nm.

8. The glass article of claim 1, further comprising an encapsulation layer substantially encapsulating the negatively doped graphene layer.

9. The glass article of claim 8, wherein the encapsulation layer comprises silicon nitride, aluminum nitride, zirconium nitride, titanium nitride, hafnium nitride, tantalum nitride, silicon oxide, aluminum oxide, or titanium oxide.

10. A device comprising the glass article of claim 1, further comprising a first contact electrically coupled to a first trace and a second contact electrically coupled to a second trace, the first trace and the second trace electrically coupled via the negatively doped graphene layer, wherein the first contact, the first trace, the second contact, and the second trace are each located on the ion-exchanged glass layer.

11. The device of claim 10, wherein the device is an electronic device, an optical device or an optoelectronic device.

12. A method of making a glass article comprising:

obtaining or providing an ion-exchanged glass layer comprising an ion-exchanged glass layer first major surface and an ion-exchanged glass layer second major surface; and locating a graphene layer on at least a portion of the ion-exchanged glass layer first major surface of to generate a negatively doped graphene layer wherein the negatively doped graphene layer has a carrier density of at least about 10$^{13}$ cm$^{-2}$.

13. The method of claim 12, wherein the negatively doped graphene layer has a carrier density of about 10$^{13}$ cm$^{-2}$ to about 10$^{15}$ cm$^{-2}$.

14. The method of claim 12, wherein the negatively doped graphene layer has a sheet resistance of from about 200 Ω/sq to about 500 Ω/sq.

15. The method of claim 12, wherein the negatively doped graphene layer has an electron mobility of from about 80 cm$^2$/V·s to about 800 cm$^2$/V·s.

16. The method of claim 12, further comprising locating an intermediate layer between at least a portion of a negatively doped graphene layer first major surface of the negatively doped graphene layer and at least a portion of at least one of the ion-exchanged glass layer first major surface or the ion-exchanged glass layer second major surface.

17. The method of claim 12, wherein a negatively doped graphene layer first major surface of the negatively doped graphene layer is in direct contact with at least a portion of at least one of the ion-exchanged glass layer first major surface or the ion-exchanged glass layer second major surface.

18. The method of claim 12, wherein the positively charged ions present in the ion-exchanged glass layer induce negative doping of the negatively doped graphene layer.

19. The method of claim 12, wherein the negatively doped graphene layer has a thickness of from about 0.1 nm to about 1 nm.

20. The method of claim 12, further comprising locating an encapsulation layer substantially encapsulating the negatively doped graphene layer.

* * * * *